(12) United States Patent
Wang et al.

(10) Patent No.: US 11,579,591 B2
(45) Date of Patent: Feb. 14, 2023

(54) FEEDFORWARD CONTROL METHOD FOR FLOATING BASE DYNAMICS, COMPUTER-READABLE STORAGE MEDIUM AND ROBOT

(71) Applicant: UBTECH ROBOTICS CORP LTD, Shenzhen (CN)

(72) Inventors: Yuesong Wang, Shenzhen (CN); Xiaozhu Ju, Shenzhen (CN); Mingguo Zhao, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 211 days.

(21) Appl. No.: 17/088,596

(22) Filed: Nov. 4, 2020

(65) Prior Publication Data
US 2022/0019196 A1    Jan. 20, 2022

(30) Foreign Application Priority Data

Jul. 14, 2020   (CN) .......................... 202010671790.1

(51) Int. Cl.
*G05B 19/4155*    (2006.01)
*B25J 9/16*    (2006.01)
*G05B 19/416*    (2006.01)

(52) U.S. Cl.
CPC ........ *G05B 19/4155* (2013.01); *B25J 9/1607* (2013.01); *G05B 19/4166* (2013.01); *G05B 2219/34013* (2013.01); *G05B 2219/50391* (2013.01)

(58) Field of Classification Search
CPC ............ G05B 19/4155; G05B 19/4166; G05B 2219/34013; G05B 2219/50391; G05B 2219/40077; B25J 9/1607
USPC ............ 318/568.12, 568.11, 568.1, 567, 560
See application file for complete search history.

(56) References Cited

U.S. PATENT DOCUMENTS

| | | | |
|---|---|---|---|
| 7,986,118 B2* | 7/2011 | Yoshikawa | G05B 19/40 318/568.22 |
| 8,676,381 B2* | 3/2014 | Kwon | B62D 57/032 700/261 |

* cited by examiner

*Primary Examiner* — David Luo

(57) ABSTRACT

A feedforward control method comprising steps of: acquiring kinematic parameters of each joint of a robot based on inverse kinematics according to a pre-planned robot motion trajectory, and setting a center of a body of the robot as a floating base; determining a six-dimensional acceleration of a center of mass of each joint of the robot in a base coordinate system using a forward kinematics algorithm, based on the kinematic parameters of each joint of the robot, and converting the six-dimensional acceleration of the center of mass of each joint of the robot in the base coordinate system to a six-dimensional acceleration in a world coordinate system; and calculating a torque required by a motor of each joint of the robot using an inverse dynamic algorithm, and controlling the motors of corresponding joints of the robot.

20 Claims, 12 Drawing Sheets

| Calculate three-dimensional angular velocity and six-dimensional acceleration of the floating base in the world coordinate system, according to a posture of the floating base measured by an inertial measurement unit and a foot of the robot that is in contact with a support surface, using the forward kinematics algorithm. | S310 |

| Perform a six-dimensional acceleration conversion for the center of mass of each joint of the robot in the base coordinate system, using a non-inertial-system-to-inertial-system acceleration conversion operator, based on the posture of the floating base and the three-dimensional angular velocity and the six-dimensional acceleration in the world coordinate system, so as to obtain the six-dimensional acceleration of the center of mass of each joint of the robot in the world coordinate system. | S320 |

FIG. 4

Starting from an nth link, according to the six-dimensional acceleration of the center of mass of one corresponding joint of the robot in the world coordinate system and an external force and an external torque of the nth link, calculate an acting force and an acting torque between the nth link and an (n-1)th link connected to the nth link using Newton's Euler formula, and calculate a torque required by the nth link based on the acting torque. — S410

Calculate a torque required by the (n-1)th link, an acting force and an acting torque between the (n-1)th link and an (n-2)th link connected to the (n-1)th link using Newton's Euler formula, with the acting force and the acting torque between the nth link and an (n-1)th link as an external force and an external torque of the (n-1)th link, decrease n by one and repeat the calculation above until a torque required by remaining of the links has been calculated. — S420

FIG. 5

Fixed-base single-foot support model
Floating-base single-foot support model
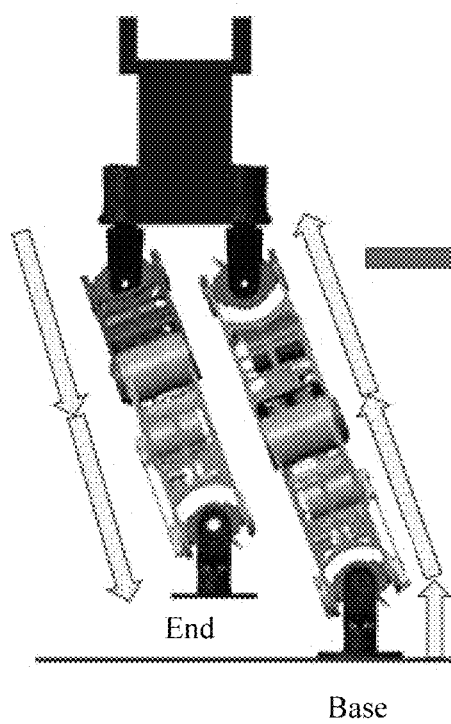
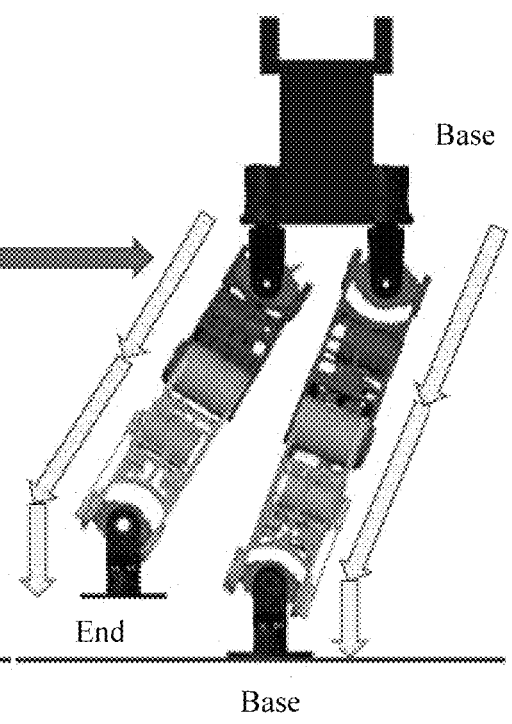
End
Base
Base
End
Base
FIG. 11

FEEDFORWARD CONTROL METHOD FOR FLOATING BASE DYNAMICS, COMPUTER-READABLE STORAGE MEDIUM AND ROBOT

CROSS REFERENCE TO RELATED APPLICATIONS

This application claims priority to Chinese Patent Application No. CN202010671790.1, filed Jul. 14, 2020, which is hereby incorporated by reference herein as if set forth in its entirety.

BACKGROUND

1. Technical Field

The present disclosure generally relates to robots, and particularly to a feedforward control method for a floating base dynamics.

2. Description of Related Art

One application scenario of the inverse dynamics algorithm is for a serial robot with a fixed base and serially-connected joints. For example, after the trajectory of the end effector of a robot has been planned, a full dynamic equation is used to solve the moment (also called torque) required by each joint at each moment based on the fixed base. Then the position control or direct force control of the motor of each joint is performed to realize the required motion.

When facing mobile robots force control applications, there are some drawbacks in the traditional fixed-base inverse dynamics control technique. For example, the application scenarios are limited, and the algorithm cannot be directly applied to mobile walking robots, such as biped or quadruped robots. In many cases, in order to apply the fixed-base inverse kinematics algorithm for robot motion control, the robot motion is usually divided into phases. For example, the walking process of a biped robot can be divided into a single-foot support period and a double-feet support period. For these two phases, different models need to be used to solve the inverse dynamics, and the double-feet support period requires much computational power due to high computational complexity. During the switching between these two phases, a torque jump phenomenon may occur, which brings great difficulty to the motion control of the walking robot.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 4 is a flowchart for implementing steps S30 of the method of FIG. 3.

FIG. 5 is a flowchart for implementing steps S40 of the method of FIG. 3.

FIG. 11 shows a biped robot based on the fixed-base and a biped robot based on the floating base when they are stand on a single leg.

DETAILED DESCRIPTION

Figure 1:
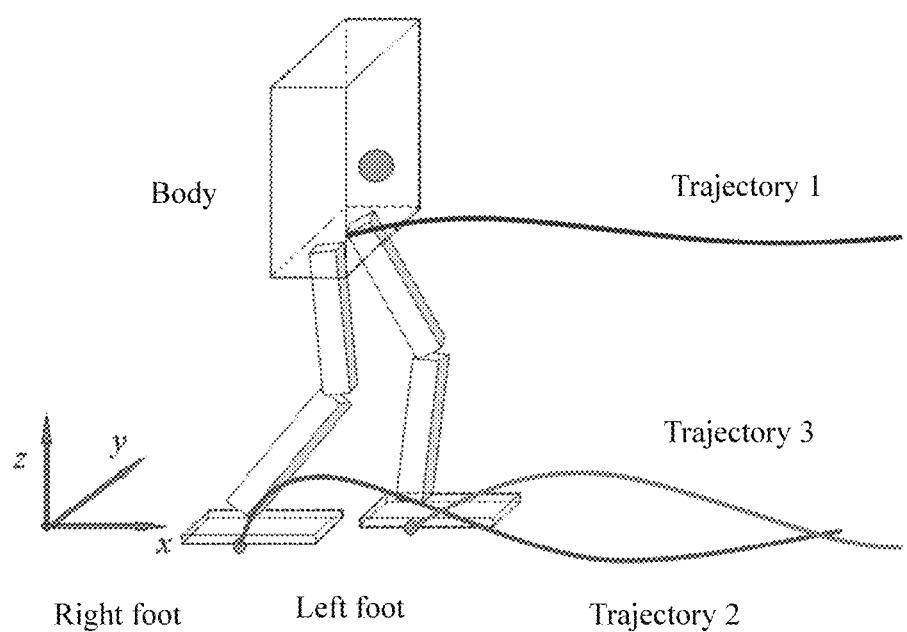
FIG. 1 is a schematic view of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

As shown in FIG. 1, simple dynamics models are often used to generate the trajectories and path planning of conventional biped robots, such as linear inverted pendulum (LIP), or dual spring-loaded inverted pendulum (Dual-SLIP), etc., and generates a trajectory 1 of the center of mass of the biped robot according to the traveling speed of the robot. Then, according to the time distribution of a single-foot support period and a double-feet support period during walking of the biped robot, trajectories 2 and 3 of the soles of the two feet of the robot are generated respectively. Finally, a position command, a speed command or a current (torque) command required by the motor of each joint can be generated based on the fixed-base robot inverse kinematics and inverse dynamics principles.

When solving fixed base inverse dynamics, attention needs to be paid according to the states of the robot. Method distinguishes when the robot is in single foot support phase or dual feet support phase. Specifically, when only a single foot of the robot is in contact with a support surface (i.e., floor, ground, etc.), the biped robot is modeled as a serial mechanical manipulator having more than ten degrees of freedom, with the single foot being a fixed base, which requires a large amount of computation to solve inverse kinematics problems. When both of the feet of the robot are in contact with the support surface, each leg of the robot is modeled as a serial manipulator, with one corresponding foot being a fixed base, which constitutes a closed-chain system. During the state switching, a torque jump phenomenon may occur, which brings great difficulty to the motion control of the walking robot.

In the present disclosure, an inverse dynamic algorithm based on floating base is used for feedforward control to solve the above-mentioned problems. The present disclosure uses the method of floating base inverse dynamics on the basis of fixed base inverse dynamics, which allows biped robots and even quadruped robots to uniformly adopt floating base inverse dynamics. That is, inverse dynamics can be solved without the estimation of robot state. The floating base inverse dynamics can be used throughout robot's motion. The discontinuities brought by state switching are therefore dismissed.

Figure 2:
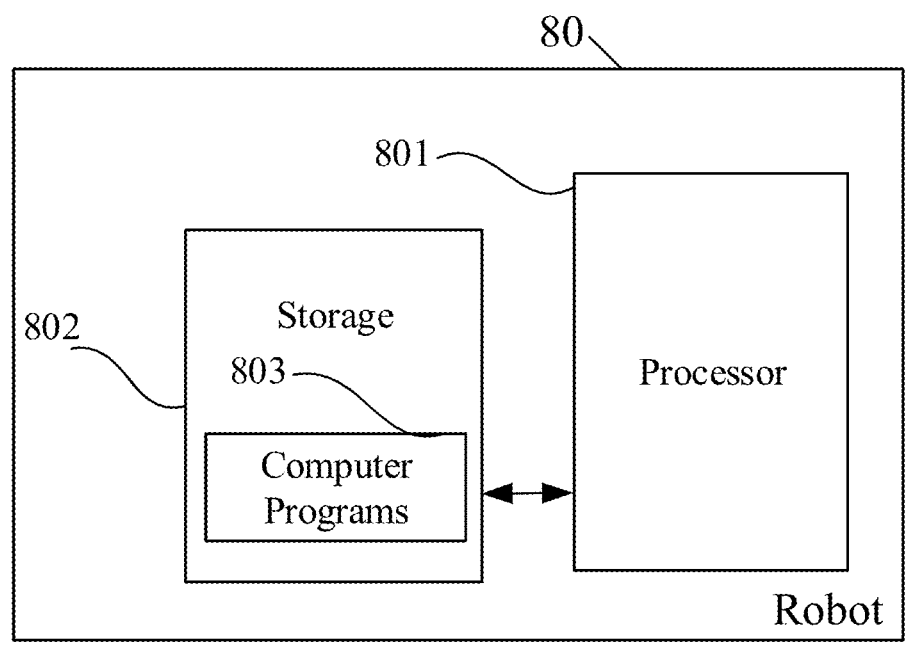
FIG. 2 is a schematic block diagram of the robot of FIG. 1.
Figure 12:
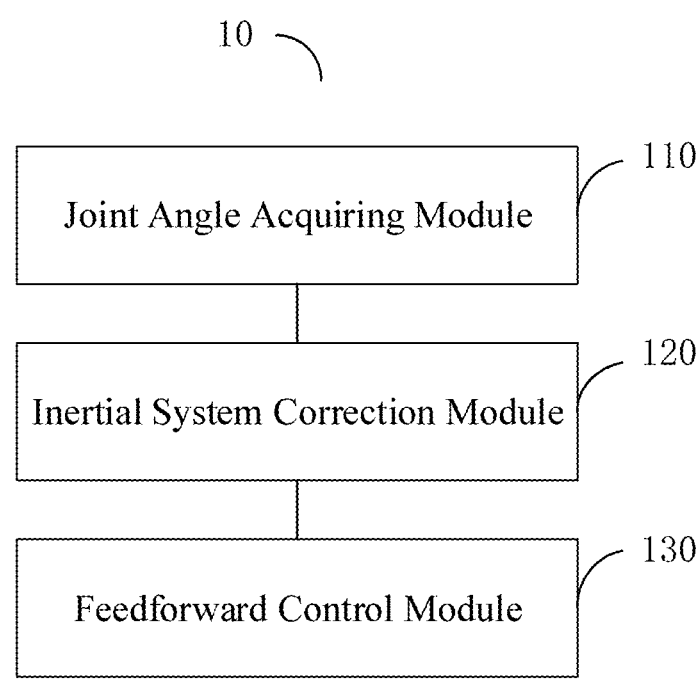
FIG. 12 is a schematic diagram view of a feedforward control device.

FIG. 2 is a schematic block diagram of a robot according to one embodiment. The robot 80 is a biped humanoid robot. In other embodiments, the robot 80 may be a quadruped robot. The robot 80 includes a processor 803, a storage 801, one or more computer programs 802 stored in the storage 801 and executable by the processor 803. When the processor 803 executes the computer programs 802, the steps in the embodiments of the method for controlling the robot 80, such as steps 10 through 50 in FIG. 3, steps S310 to S320 in FIG. 4, steps S410 to S420 in FIG. 5, and functions of modules/units in the embodiments, such as units 110 through 130 in FIG. 12, are implemented.

Exemplarily, the one or more computer programs 802 may be divided into one or more modules/units, and the one or more modules/units are stored in the storage 801 and executed by the processor 803. The one or more modules/units may be a series of computer program instruction segments capable of performing specific functions, and the instruction segments are used to describe the execution process of the one or more computer programs 802 in the robot 80. For example, the one or more computer programs 802 may be divided into a joint angle acquiring module, an inertial system correction module, and a feedforward control module. The specific functions of each module are as follows:

The joint angle acquiring module acquires kinematic parameters of each joint of the robot at each moment based on inverse kinematics according to a pre-planned robot motion trajectory, and sets a center of a body of the robot as a floating base. The inertial system correction module determines a six-dimensional acceleration of a center of mass of each joint of the robot in a base coordinate system using a forward kinematics algorithm, based on the kinematic parameters of each joint of the robot, and converts the six-dimensional acceleration of the center of mass of each joint of the robot in the base coordinate system to a six-dimensional acceleration in a world coordinate system. The feedforward control module calculates a torque required by a motor of each joint of the robot using an inverse dynamic algorithm, based on the six-dimensional acceleration of the center of mass of each joint of the robot in the world coordinate system, and controls the motors of corresponding joints of the robot using a feedforward control, based on the calculated torque.

It should be noted that FIG. 2 is merely an example of the robot 80, and does not limit the robot 80. The robot 80 may include components different in numbers from those illustrated, or incorporate some other different components. For example, the robot 80 may further include an input and output device, a network access device, a bus, and the like.

The processor 803 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 801 may be an internal storage unit of the robot 80, such as a hard disk or a memory. The storage 801 may also be an external storage device of the robot 80, such as a plug-in hard disk, a smart memory card (SMC), and a secure digital (SD) card, or any suitable flash cards. Furthermore, the storage 801 may also include both an internal storage unit and an external storage device. The storage 801 is used to store computer programs, other programs, and data required by the robot. The storage 801 can also be used to temporarily store data that have been output or is about to be output.

Figure 3:
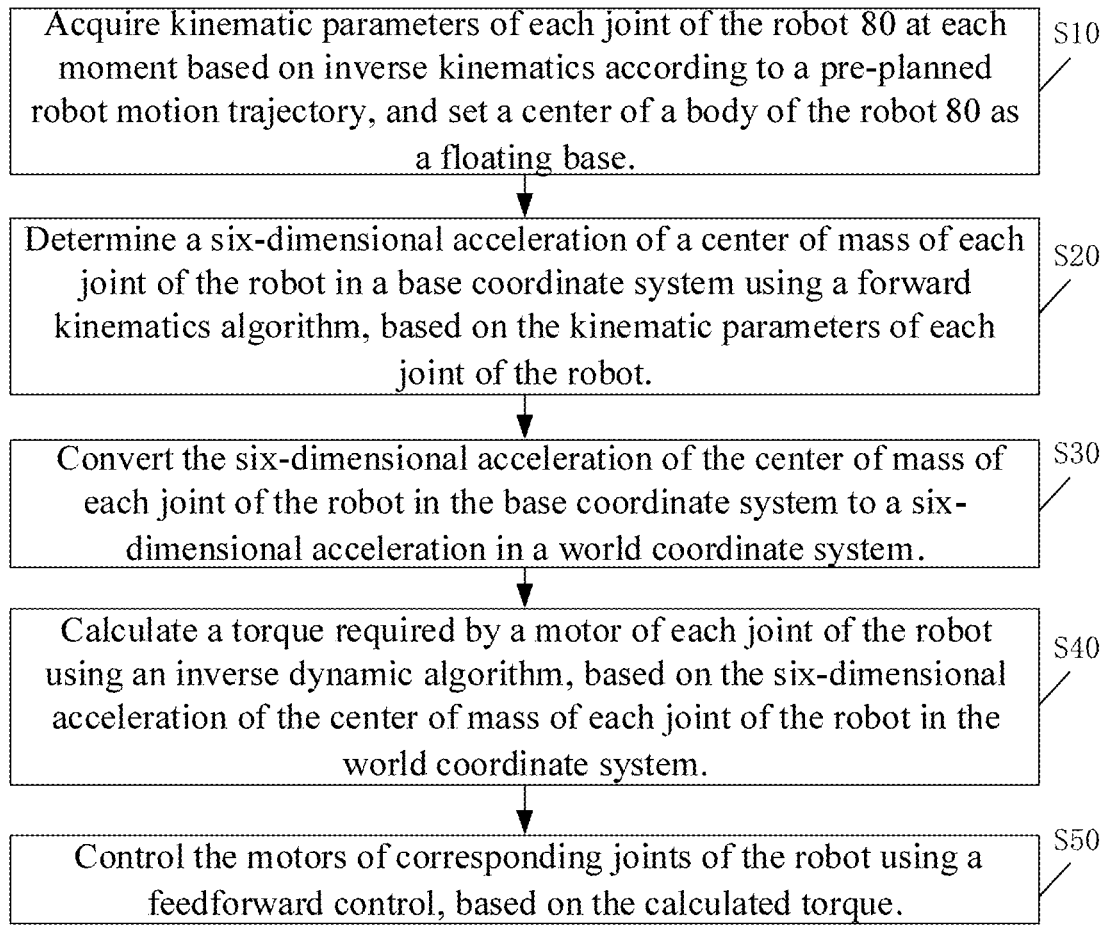
FIG. 3 is a flowchart of a feedforward control method according to one embodiment.

FIG. 3 is a flowchart of a feedforward control method for controlling the robot 80. The method can be applied to the motion control of multi-legged robots, such as biped humanoid robots and quadruped robots. The method can effectively solve the problems of high computational complexity, large amount of computation, and sudden changes in joint torque (i.e., torque jump) caused by the use of fixed-base inverse dynamic algorithms in the conventional solutions. In the embodiment, the method includes the following steps:

Step S10: Acquire kinematic parameters of each joint of the robot 80 at each moment based on inverse kinematics according to a pre-planned robot motion trajectory, and set a center of a body of the robot 80 as a floating base.

In the step S10 above, the pre-planned motion trajectory of the robot can be the motion trajectory of the center of mass of the robot, the motion trajectory of the feet (also called the ends), etc. Then the inverse kinematics can be used to calculate the kinematic parameters of each joint of the robot at each moment from the motion trajectory, such as joint position, joint angle, joint angular velocity, and joint angular acceleration. In one embodiment, they can be calculated by using inverse dynamic algorithms such as the robot position loop, velocity loop, and acceleration loop, which will not be described in detail here.

Then, the center of the body of the robot is set as the floating base, and each foot of the robot is regarded as an end. The inverse dynamics of each foot is then calculated independently in the inertial coordinate system of the body of the robot. It should be noted that the center of the body of the robot moves when the robot walks, and the base is thus called a floating base. Since the base has inertial acceleration when the robot walks, the coordinate system based on the body of the robot is also called the inertial coordinate system.

Steps S20: Determine a six-dimensional acceleration of a center of mass of each joint of the robot in a base coordinate system using a forward kinematics algorithm, based on the kinematic parameters of each joint of the robot.

After the joint angle, angular velocity, and angular acceleration of each joint are obtained, the six-dimensional acceleration of the center of mass of each joint relative to the base of the robot is calculated by using a forward kinematics principle. The six-dimensional velocity of the center of mass of each joint relative to the base can also be calculated.

In the above step S20, the base coordinate system refers to a coordinate system established with the base of the robot as a reference point. In the embodiment, the center of the body of the robot is selected as the floating base, so the six-dimensional acceleration in the base coordinate system mentioned above is the six-dimensional acceleration of the center of mass of each joint relative to the center of the body.

The can be calculated in turn. The position, posture and centroid position of each rigid body, etc.

The position and posture of each rigid body coordinate system and an end coordinate system of the serial structure, as well as the position of the center of mass of each rigid body, can be calculated using the chain rule of the homogeneous coordinate transformation matrix based on the principle of forward kinematics, according to the kinematic parameters of the joint angle, joint angular velocity and joint angular acceleration.

The velocity and acceleration of the center of mass of each joint, as well as the velocity and acceleration of the end coordinate system, all satisfy the following forward kinematics formula: $V_i = J_i \cdot \dot{\Theta}$ and $a_i = J_i \cdot \ddot{\Theta} + \dot{J}_i \cdot \dot{\Theta}$, where $V_i$ represents the six-dimensional velocity of the center of mass of the i-th joint (or end coordinate system), which is a 6×1 column vector including three-dimensional linear velocity and three-dimensional angular velocity in the 3D coordinate system, $a_i$ represents the six-dimensional acceleration of the center of mass the i-th joint (or end coordinate system) in the base coordinate system, which is a 6×1 column vector including three-dimensional linear acceleration and three-dimensional angular acceleration. $J_i$ represents the Jacobian matrix of the center of mass of the i-th joint (or end coordinate system) relative to the base. For a serial robot having n degrees of freedom, $J_i$ is a 6×n matrix. $\dot{J}_i$ represents the Jacobian derivation matrix of the center of mass of the i-th joint, which is obtained by deriving the Jacobian matrix above, $\dot{\Theta}$ represents the joint angular velocity vector of the center of mass of each joint (or end coordinate system), which is an n×1 column vector including n joint angular velocities, $\ddot{\Theta}$ represents the joint angular acceleration vector of the center of mass of each joint (or end coordinate system), which is a column vector of n×1 including n joint angular accelerations.

The six-dimensional acceleration of the center of mass of the corresponding joint in the base coordinate system can be calculated by the above formula. For example, for a single-leg 6-DOF biped robot, if it is required to solve the 6-dimensional acceleration a2 of the center of mass of the second joint in the base coordinate system, the corresponding Jacobian matrix J2 will be a 6×6 matrix. Specifically, each joint angle obtained in step S10 can be calculated based on forward kinematics. That is, $\dot{\Theta}$ is a 6×1 column vector including 6 joint angular velocities, and $\ddot{\Theta}$ is a 6×1 column vector including 6 joint angular accelerations. In the 6×6 Jacobian matrix J2, all of the values of the third column through the sixth column columns are 0, and the upper three elements and the lower three elements in each of the first two columns are the differential of the linear velocity and the differential of the angular velocity of the center of mass of the second joint by the corresponding motor. By deriving J2, and then using the above formula, the six-dimensional acceleration $a_2$ of the center of mass of the second joint in the base coordinate system can be calculated.

The six-dimensional acceleration of the center of mass of each joint obtained in the above step S20 is in the base coordinate system which is a non-inertial coordinate system, so the Newton-Euler inverse dynamic algorithm cannot be used directly for iterative solution. For this reason, the present embodiment proposes to perform inertial system correction on the six-dimensional acceleration of the center of mass of all the joints in the base coordinate system and project them into the world coordinate system.

Step S30: Convert the six-dimensional acceleration of the center of mass of each joint of the robot in the base coordinate system to a six-dimensional acceleration in a world coordinate system.

Referring to FIG. 4, in one embodiment, the step S30 further includes the following steps.

Step S310: Calculate three-dimensional angular velocity and six-dimensional acceleration of the floating base in the world coordinate system, according to a posture of the floating base measured by an inertial measurement unit and a foot of the robot that is in contact with a support surface, using the forward kinematics algorithm.

Step S320: Perform a six-dimensional acceleration conversion for the center of mass of each joint of the robot in the base coordinate system, using a non-inertial-system-to-inertial-system acceleration conversion operator, based on the posture of the floating base and the three-dimensional angular velocity and the six-dimensional acceleration in the world coordinate system, so as to obtain the six-dimensional acceleration of the center of mass of each joint of the robot in the world coordinate system.

For the above step S310, the single foot of the robot in contact with the support surface is regarded as the origin of the coordinate system, and regarded as a fixed base. Then, according to the acquired angles of each joint, the position and posture the six-dimensional velocity, six-dimensional acceleration of the robot's body are calculated using the chain rule of the forward kinematics homogeneous coordinate transformation matrix. For details, please refer to the above-mentioned forward kinematics formula, which will not be repeated here. Given that the current foot in contact with the support surface may be unstable due to uneven floor or stepping on obstacles, the inertial measurement unit IMU provided on the body of the robot will be used to measure the posture of the body, such that posture correction of the body (i.e., floating base) can be performed.

After obtaining the six-dimensional acceleration of the floating base in the world coordinate system, step S320 is then performed to convert the acceleration from the non-inertial system to the inertial system. The acceleration of the center of mass of the joints in the non-inertial system can be converted into the acceleration in the inertial system using a non-inertial-system-to-inertial-system acceleration conversion operator.

In one embodiment, the input of the operator includes: a vector of the center of mass of a joint in the base coordinate system, which is a 3×1 column vector; the posture matrix of the base in the world coordinate system, which is a 3×3 matrix; six-dimensional velocity of the base in the world coordinate system, which includes 3×1 three-dimensional linear velocity and 3×1 three-dimensional angular velocity; six-dimensional acceleration of the base in the world coordinate system, which includes 3×1 three-dimensional linear acceleration and 3×1 three-dimensional angular acceleration; six-dimensional velocity of the center of mass of the joint in the base coordinate system, which includes 3×1 three-dimensional linear velocity and 3×1 three-dimensional angular velocity; and six-dimensional acceleration of the center of mass of the joint in the base coordinate system, which includes 3×1 three-dimensional linear acceleration and 3×1 three-dimensional angular acceleration. The output of the operator includes three-dimensional linear acceleration of the center of mass of the joint in the world coordinate system, which is a 3×1 column vector, and three-dimensional angular acceleration of the center of mass of the joint in the world coordinate system, which is a 3×1 column vector.

The posture matrix of the aforementioned base in the world coordinate system can be measured and calculated by the inertial measurement unit (IMU). The function of this operator can be understood as adding inertial force to the non-inertial system, such as balanced inertial force, centrifugal force, Coriolis force, etc., to obtain the corresponding calculation formula to realize the conversion. It should be noted that the above-mentioned base coordinate system and the world coordinate system are both three-dimensional coordinate systems. In the three-dimensional coordinate systems, the positive axis directions of the x, y, and z axes satisfy the right-hand rule.

In one embodiment, the calculation formula of the non-inertial-system-to-inertial-system acceleration conversion operator may be as follows:

$\partial_{word\_i} = \partial_{base} + R_{base} \cdot \partial_i + w_{base} \times R_{base} \cdot v_i + \beta_{base} \times R_{base} \cdot r_i + w_{base} \times w_{base} \times R_{base} \cdot r_i + w_{base} \times R_{base} \cdot v_i$; and $\beta_{word\_i} = \beta_{base} + w_{base} \times R_{base} \cdot w_i + R_{base} \cdot \beta_i$, where $\partial_{word\_i}$ and $\beta_{word\_i}$ represent linear acceleration and angular acceleration of a center of mass of an i-th of the joints of the robot in the world coordinate system, $\partial_{base}$ and $\beta_{base}$ represent linear acceleration and angular acceleration of the floating base in the world coordinate system, $w_{base}$ represents three-dimensional angular velocity of the base in the world coordinate system, $R_{base}$ represents a posture matrix of the base in the world coordinate system, $r_i$ represents a vector of the center of mass of the i-th of the joints of the robot in the base coordinate system, $v_i$ and $w_i$ represent linear velocity and angular velocity of the center of mass of the i-th of the joints of the robot in the base coordinate system, and $\partial i$ and $\beta i$ represent linear acceleration and angular acceleration of the center of mass of the i-th of the joints of the robot in the base coordinate system. It should be understood that the above linear acceleration, angular acceleration, linear velocity, and angular velocity input into the operator are all three-dimensional vectors in the world coordinate system or in the base coordinate system.

Therefore, after the above conversion, the six-dimensional acceleration of the center of mass of each joint in the world coordinate system will be obtained, which belongs to the inertial coordinate system. Thus, the Newton-Euler inverse dynamics algorithm can be used for multiple iterations to calculate the required torque of each joint motor at each moment.

Step S40: Calculate a torque required by a motor of each joint of the robot using an inverse dynamic algorithm, based on the six-dimensional acceleration of the center of mass of each joint of the robot in the world coordinate system.

The method in the embodiment is applicable to a multi-legged robot. Generally, the robot has at least two feet. Since each foot is connected to the torso of the robot, and the torso is used as the base of the robot. Therefore, each leg can be solved by an independent inverse dynamic algorithm based on the floating base, and the solving principle for each leg is the same.

Referring to FIGS. 4 and 5, the following description will take the torque required by the motor of each joint of a single foot as an example to explain the solution process. If the degree of freedom of the robot's single leg is n, the step S40 further includes:

Step S410: Starting from an nth link, according to the six-dimensional acceleration of the center of mass of one corresponding joint of the robot in the world coordinate system and an external force and an external torque of the nth link, calculate an acting force and an acting torque between the nth link and an (n−1)th link connected to the nth link using Newton's Euler formula, and calculate a torque required by the nth link based on the acting torque.

Step S420: Calculate a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, decrease n by one and repeat the step of calculating a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, until a torque required by remaining of the links has been calculated.

Figure 6:
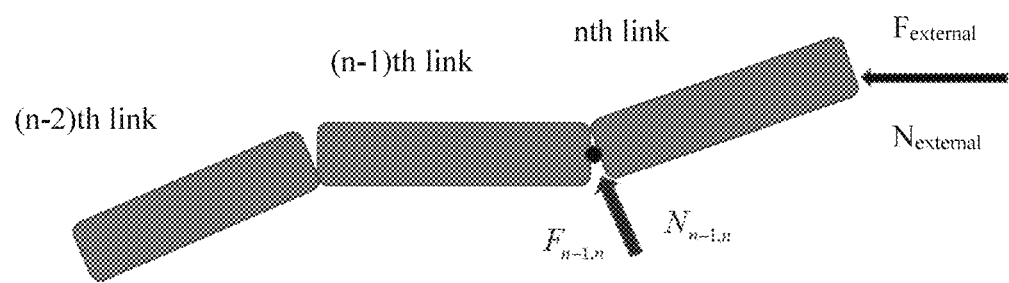
FIG. 6 shows a force and a torque acting on a serial robot controlled according to a method of FIG. 3.

As shown in FIG. 6, the last link (i.e., the nth link) is subjected to an external force and a reaction force from the (n−1)th link directly connected to the last link. In the inertial system, the Newton equation that the resultant force F received by a rigid body satisfies: $\vec{F} = m\vec{a}$, where m represents the mass of the rigid body, and $\vec{a}$ represents the linear acceleration of the rigid body in the world coordinate system. The resultant force on the last link will satisfy:

$$\overrightarrow{F_{n,n-1}} + \overrightarrow{F_{external}} + m_n\vec{g} = m_n\overrightarrow{a_{world,n}},$$

where $m_n$ represents mass of the nth link, $\overrightarrow{a_{world,n}}$ represents three-dimensional linear acceleration of the nth link in the world coordinate system, $\vec{g}$ represents acceleration of gravity, $\overrightarrow{F_{external}}$ represents the external force acting on the nth link, and $\overrightarrow{F_{n,n-1}}$ represents the acting force between the nth link and the (n−1)link.

The above-mentioned three-dimensional linear acceleration $\overrightarrow{a_{world,n}}$ of the nth link in the world coordinate system can be calculated according to step S30 above. The external force and torque acting on the nth link and the three-dimensional acceleration of the nth link can be calculated according to the planned trajectory. When the nth link is in no contact with an external object, the external force and external torque acting on the nth link are zero. When the nth link is in contact with a support surface (i.e., floor, ground), the external force of the nth link is the support force from the support surface.

When the nth link is subject to an external force and torque, the torque equation of the nth link at the center of mass satisfies:

$$\overrightarrow{N_n} = \overrightarrow{N_{external}} + \overrightarrow{N_{n-1,n}} + \vec{r_1} \times \overrightarrow{F_{n-1,n}} + \vec{r_2} \times \overrightarrow{F_{external}},$$

where $\overrightarrow{N_n}$ represents a resultant torque of the nth link at a center of mass thereof, $\overrightarrow{N_{external}}$ represents the external force acting on the nth link, $\overrightarrow{N_{n-1,n}}$ represents the acting torque applied to the nth link by the (n−1)th link, $\vec{r_1}$ represents a vector from a contact point of the (n−1)th link to the center of mass of the nth link, and $\vec{r_2}$ represents a vector from a contact point with the support surface to the center of mass of the nth link.

The torque acting on the nth link satisfies the Euler's equation:

$$\vec{N_n} = I_n \cdot \vec{\dot{w}_n} + \vec{w_n} \times I_n \vec{w_n},$$

where $I_n$ represents moment of inertia of the nth link, $\vec{\dot{w}_n}$ represents a joint angular acceleration vector of the nth link, and $\vec{w_n}$ represents a joint angular velocity vector of the nth link.

The acting torque applied to the nth link by the (n−1)th link can be determined as follows:

$$\vec{N_{n-1,n}} = I_n \times \vec{\dot{w}_n} + \vec{w_n} \times I_n \vec{w_n} - \vec{N_{external}} - \vec{r_1} \times \vec{F_{n-1,n}} - \vec{r_2} \times \vec{F_{external}}.$$

The torque applied to the nth link by the (n−1)th link is then projected to the rotating shaft of a motor to obtain the torque required by the nth link. Therefore, the formula for calculating the torque required by the nth link is as follows:

$$\tau_n = \vec{z_n} \cdot \vec{N_{n-1,n}},$$

where $\tau_n$ represents the torque required by the nth link, and $\vec{z_n}$ represents the direction vector of the rotating shaft of the motor.

The torque required by the nth link can be calculated according to rom the above steps. That is, the torque that a corresponding motor should output at this moment. The torque required by the remaining (n−1) links can be calculated in similar manner. That is, the external force and external torque received by the nth link are replaced with the acting force and acting torque between the current link and the next link, and then the torque required by each of the (n−1) links is calculated using the same steps above.

Step S50: Control the motors of corresponding joints of the robot using a feedforward control, based on the calculated torque.

After obtaining the torque that the motor of each joint should output, the torque can be sent to the corresponding motor through feedforward control. For example, for a position-controlled motor, the corresponding relationship between the torque and the feed-forward current and the calculated torque can be used to determine the corresponding feed-forward current value. The feedforward current value is superimposed on the control signal of the corresponding motor to realize the control of the robot. In an alternative embodiment, for torque-controlled motors, direct force control can be performed based on the calculated torque. The acceleration compensation of the robot through the feedforward control method can improve the motion capability of the robot.

Figure 7:
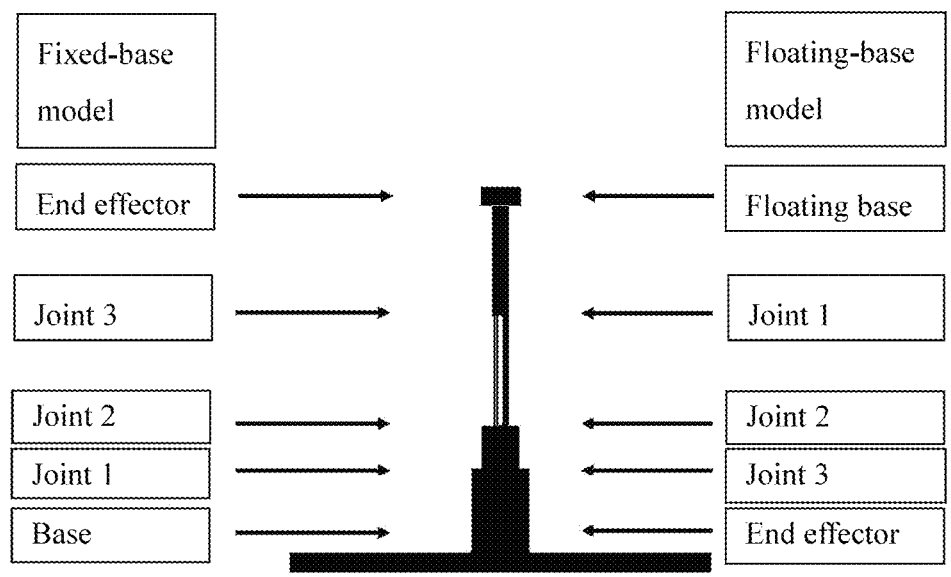
FIG. 7 is a schematic view of a 3-DOF robot with a base in contact with a support surface.

FIG. 7 shows the model of a 3-DOF mechanical arm with a base fixed on the ground. For a traditional manipulator control scheme, as shown on the left in FIG. 7, the trajectory of the top end effector in the world coordinate system is given, and then a fixed-base inverse dynamic algorithm is used. Staring from the end effector, the torque to be output by each motor at each moment is sequentially calculated. The present embodiment adopts the control scheme of the floating base inverse dynamics algorithm, as shown on the right in FIG. 7. That is, after obtaining the six-dimensional acceleration of the uppermost real end effector, the end effector is used as the "base" and the lower real base is used as the "end effector." The torque to be output by the motor of each joint at each moment is calculated from bottom to top.

Figure 8:
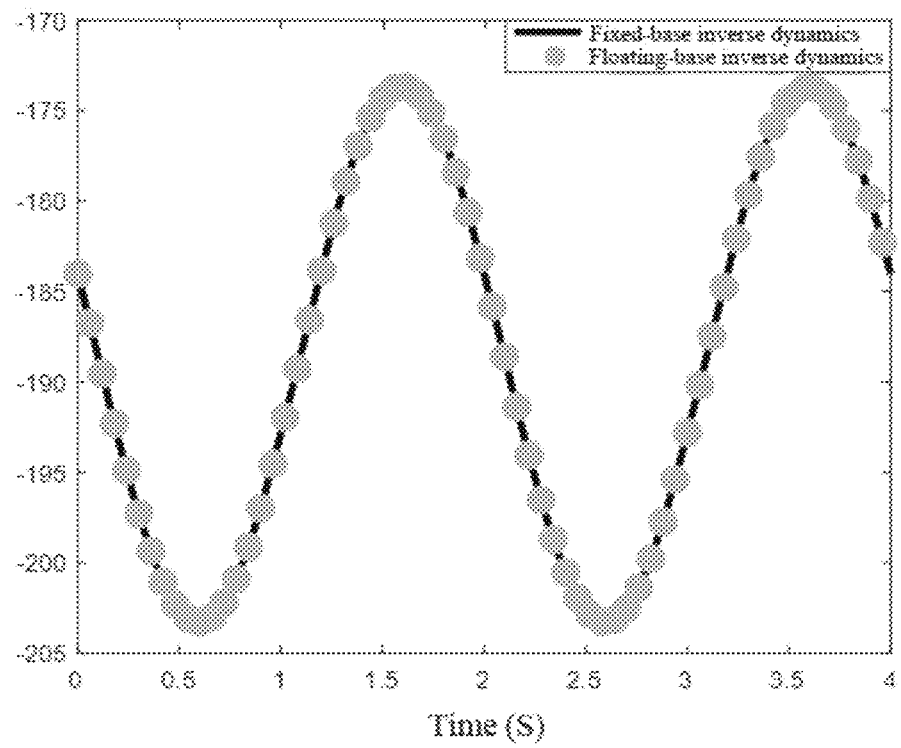
FIG. 8 shows test results of a first motor that is controlled based on fixed-base inverse dynamics and based on floating-base inverse dynamics.
Figure 9:
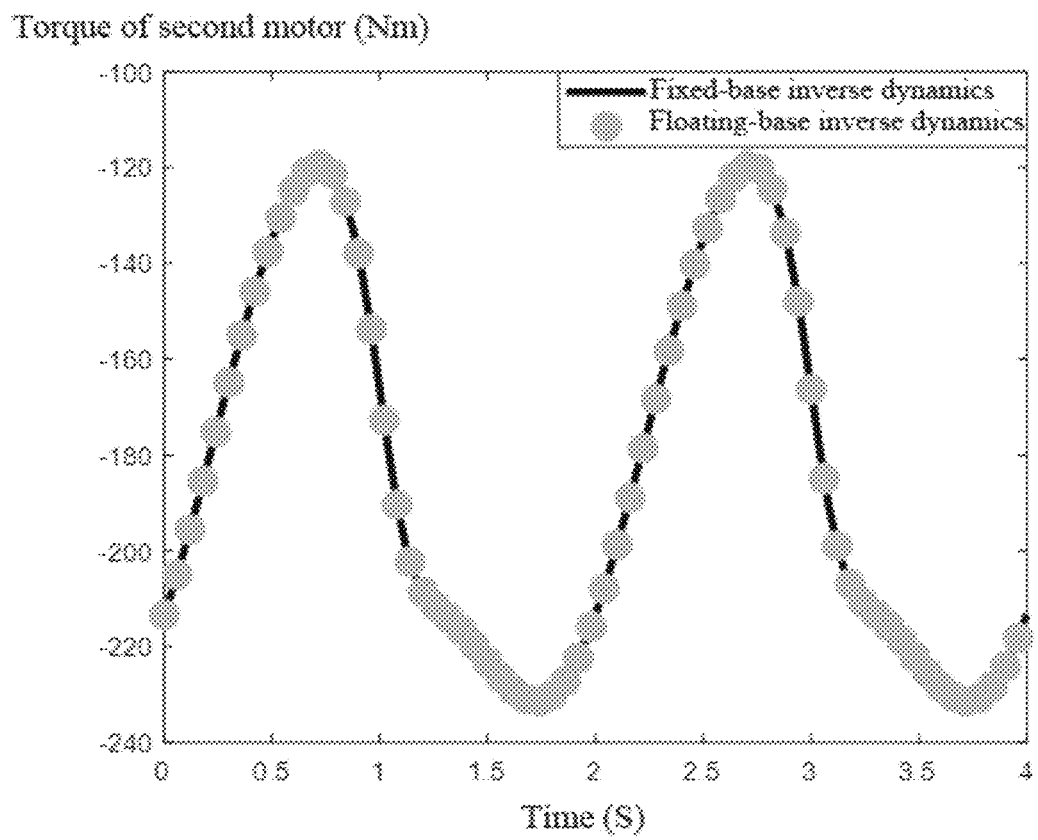
FIG. 9 shows test results of a second motor that is controlled based on fixed-base inverse dynamics and based on floating-base inverse dynamics.
Figure 10:
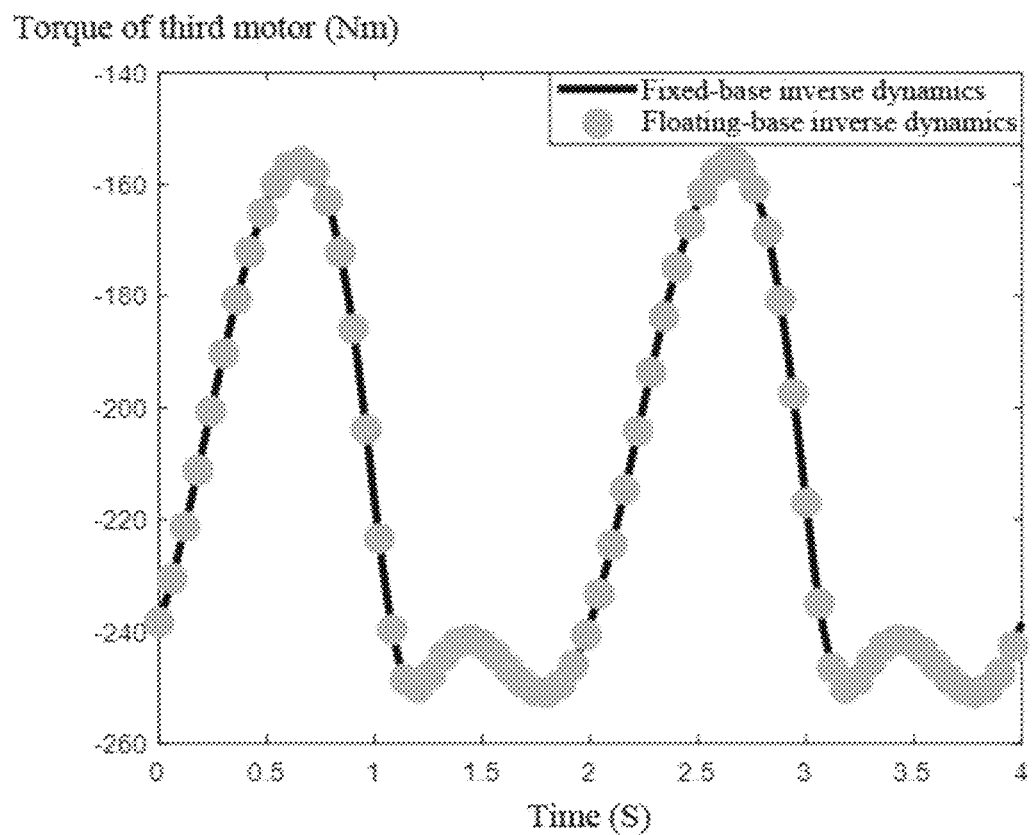
FIG. 10 shows test results of a third motor that is controlled based on fixed-base inverse dynamics and based on floating-base inverse dynamics.

FIGS. 8-10 show the torque test results of the first, second and third motors of a three-degree-of-freedom manipulator model. In each of the figures, the continuous curve represents the calculation result according to fixed base inverse dynamics, and the dotted curve represents the calculation result according to floating base inverse dynamics. It can be seen from FIGS. 8-10 that the torque results of each motor calculated by the two methods are the same, which means that the floating basis inverse dynamics can be applied to biped, quadruped and other multi-legged robots.

The feedforward control method of the present disclosure has the following beneficial effects. The body of the robot is used as the robot base, the floating-base dynamics theory is used to solve the inverse dynamics during the walking of the robot, and an inertial system correction is performed to the fixed-base robot inverse dynamics algorithm, which allows the conventional inverse dynamics algorithm of robot based on fixed base to be extended to solve the inverse dynamics of robots based on a moving base.

The method of the present disclosure does not require dividing the robot's motion process into a single-leg support period or a multi-leg support period. After the pose, the six-dimensional velocity, and the six-dimensional acceleration of the body of the robot serving as the base and the force acting on the feet of the robot are obtained, the torque to be output by the motor of each joint at each moment can be calculated according to the pre-planned robot motion trajectory.

The inverse dynamics based on the floating base in the method of the present disclosure can simplify the inverse dynamics operation of the robot, and greatly reduce the computational complexity and the amount of computation. For example, for a biped humanoid robot with two 6-DOF single legs, in the conventional solution, an inverse dynamics algorithm with 12 degrees of freedom in series needs to be solved during the single-foot support period, and a parallel 6-DOF inverse dynamic algorithm needs to be solved in the double-feet support period. By contrast, the method of the present disclosure based on the floating base only requires modeling the two legs of the robot as two 6-DOF serial robots at any moment, and the calculation for the two legs does not interfere with each other, as shown in FIG. 11.

The torque required by each joint is solved in real time based on the floating base dynamics, and is sent to the corresponding motor, which can effectively avoid the torque jump of the conventional fixed-base inverse dynamic algorithm which is caused by state switching between the single-foot support period and the double-feet support period during the walking process, and can improve the tracking effect of each joint motor and the walking ability of the robot.

Referring to FIG. 12, in one embodiment, a feedforward control device 10 includes a joint angle acquiring module 110, an inertial system correction module 120, and a feedforward control module 130.

The joint angle acquiring module 110 acquires kinematic parameters of each joint of the robot at each moment based on inverse kinematics according to a pre-planned robot motion trajectory, and sets a center of a body of the robot as a floating base. The inertial system correction module 120 determines a six-dimensional acceleration of a center of mass of each joint of the robot in a base coordinate system using a forward kinematics algorithm, based on the kinematic parameters of each joint of the robot, and converts the six-dimensional acceleration of the center of mass of each joint of the robot in the base coordinate system to a six-dimensional acceleration in a world coordinate system. The feedforward control module 130 calculates a torque required by a motor of each joint of the robot using an inverse dynamic algorithm, based on the six-dimensional acceleration of the center of mass of each joint of the robot in the world coordinate system, and controls the motors of corresponding joints of the robot using a feedforward control, based on the calculated torque.

The present disclosure further provides a computer-readable storage medium, which stores computer programs, and when the computer programs are implemented, the above-mentioned feedforward control method is implemented.

In the embodiments provided by the present disclosure, it should be noted that the disclosed apparatus (device)/terminal device and method may be implemented in other manners. The above-mentioned apparatus (device)/terminal device embodiment is merely exemplary. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functional modules or units in the various embodiments of the present invention may be integrated together to form an independent part, or each module may exist alone, or two or more modules may be integrated to form an independent part.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented feedforward control method for floating base dynamics, comprising executing on a processor steps of:
   acquiring kinematic parameters of each joint of a robot at each moment based on inverse kinematics according to a pre-planned robot motion trajectory, and setting a center of a body of the robot as a floating base;
   determining a six-dimensional acceleration of a center of mass of each joint of the robot in a base coordinate system using a forward kinematics algorithm, based on the kinematic parameters of each joint of the robot, and converting the six-dimensional acceleration of the center of mass of each joint of the robot in the base coordinate system to a six-dimensional acceleration in a world coordinate system; and
   calculating a torque required by a motor of each joint of the robot using an inverse dynamic algorithm, based on the six-dimensional acceleration of the center of mass of each joint of the robot in the world coordinate system, and controlling the motors of corresponding joints of the robot using a feedforward control, based on the calculated torque.

2. The method of claim 1, wherein the kinematic parameters comprise angle, angular velocity and angular acceleration of the joint, a forward kinematic equation for calculating the six-dimensional acceleration of the center of mass of each joint of the robot in the base coordinate system is as follows:
$$a_i = J_i \cdot \ddot{\Theta} + \dot{J}_i \cdot \dot{\Theta}$$
where $a_i$ represents the six-dimensional acceleration of the center of mass of each joint of the robot in the base coordinate system, $J_i$ represents a Jacobian matrix of the center of mass of an i-th of the joints of the robot relative to the floating base, $\dot{J}_i$ represents a derivation matrix of the Jacobian matrix, $\dot{\Theta}$ represents angular velocity vector of each joint of the robot, $\ddot{\Theta}$ represents angular acceleration vector of each joint of the robot.

3. The method of claim 1, wherein the body of the robot comprises an inertial measurement unit, the step of converting the six-dimensional acceleration of the center of mass of each joint of the robot in the base coordinate system to a six-dimensional acceleration in a world coordinate system, comprises:
   calculating three-dimensional angular velocity and six-dimensional acceleration of the floating base in the world coordinate system, according to a posture of the floating base measured by the inertial measurement unit and a foot of the robot that is in contact with a support surface, using the forward kinematics algorithm; and
   performing a six-dimensional acceleration conversion for the center of mass of each joint of the robot in the base coordinate system, using a non-inertial-system-to-inertial-system acceleration conversion operator, based on the posture of the floating base and the three-dimensional angular velocity and the six-dimensional acceleration in the world coordinate system, so as to obtain the six-dimensional acceleration of the center of mass of each joint of the robot in the world coordinate system.

4. The method of claim 3, wherein a formula of the non-inertial-system-to-inertial-system acceleration conversion operator is as follows:

$\partial_{word\_i} = \partial_{base} + R_{base} \cdot \partial_i + w_{base} \times R_{base} \cdot v_i + \beta_{base} \times R_{base} \cdot r_i + w_{base} \times w_{base} \times R_{base} \cdot r_i + W_{base} \times R_{base} \cdot v_i$; $\beta_{word\_i} = \beta_{base} + w_{base} \times R_{base} \cdot w_i + R_{base} \cdot \beta_i$, where $\partial_{word\_i}$ and $\beta_{word\_i}$ represent linear acceleration and angular acceleration of a center of mass of an i-th of the joints of the robot in the world coordinate system, $\partial_{base}$ and $\beta_{base}$ and represent linear acceleration and angular acceleration of the floating base in the world coordinate system, $w_{base}$ represents three-dimensional angular velocity of the base in the world coordinate system, $R_{base}$ represents a posture matrix of the base in the world coordinate system, $r_i$ represents a vector of the center of mass of the i-th of the joints of the robot in the base coordinate system, $v_i$ and $w_i$ represent linear velocity and angular velocity of the center of mass of the i-th of the joints of the robot in the base coordinate system, and $\partial_i$ and $\beta_i$ represent linear acceleration and angular acceleration of the center of mass of the i-th of the joints of the robot in the base coordinate system.

5. The method of claim 1, wherein the robot has n degrees of freedom and comprises n links when a single foot of the robot stays in contact with a support surface, the step of calculating a torque required by a motor of each joint of the robot using an inverse dynamic algorithm, based on the six-dimensional acceleration of the center of mass of each joint of the robot in the world coordinate system, comprises:
    starting from an nth link, according to the six-dimensional acceleration of the center of mass of one corresponding joint of the robot in the world coordinate system and an external force and an external torque of the nth link, calculating an acting force and an acting torque between the nth link and an (n−1)th link connected to the nth link using Newton's Euler formula, and calculating a torque required by the nth link based on the acting torque; and
    calculating a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, decreasing n by one and repeating the step of calculating a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, until a torque required by remaining of the links has been calculated.

6. The method of claim 5, wherein if the nth link is in contact with the support surface, the external force received bye the nth link is a supporting force from the support surface.

7. The method of claim 6, wherein the acting force between the nth link and the (n−1)th link are calculated according to a formula as follows:

$$\overrightarrow{F_{n,n-1}} + \overrightarrow{F_{external}} + m_n \vec{g} = m_n \overrightarrow{a_{world,n}},$$

wherein $\overrightarrow{F_{n,n-1}}$ represents the acting force between, the nth link and the (n−1)th link, $m_n$ represents mass of the nth link, $\overrightarrow{a_{world,n}}$ represents three-dimensional linear acceleration of the nth link in the world coordinate system, $\vec{g}$ represents acceleration of gravity, and $\overrightarrow{F_{external}}$ represents the external force acting on the nth link.

8. The method of claim 7, wherein the step of calculating the acting torque between the nth link and the (n−1)th link comprises:
    calculating the acting torque applied to the nth link by the (n−1)th link according to a torque equation and a Euler formula, the torque equation is as follows:

$$\overrightarrow{N_n} = \overrightarrow{N_{external}} + \overrightarrow{N_{n-1,n}} + \vec{r_1} \times \overrightarrow{F_{n-1,n}} + \vec{r_2} \times \overrightarrow{F_{external}},$$

where $\overrightarrow{N_n}$ represents a resultant torque of the nth link at a center of mass thereof, $\overrightarrow{N_{external}}$ represents the external force acting on the nth link, $\overrightarrow{N_{n-,n}}$ represents the acting torque applied to the nth link by the (n−1)th link, $\vec{r_1}$ represents a vector from a contact point of the (n−1)th link to the center of mass of the nth link, $\vec{r_2}$ represents a vector from a contact point with the support surface to the center of mass of the nth link;
    the Euler formula is as follows:

$$\overrightarrow{N_n} = I_n \cdot \overrightarrow{\dot{w}_n} + \overrightarrow{w_n} \times I_n \overrightarrow{w_n},$$

where $I_n$ represents moment of inertia of the nth link, $\overrightarrow{\dot{w}_n}$ represents a joint angular acceleration vector of the nth link, and $\overrightarrow{w_n}$ represents a joint angular velocity vector of the nth link.

9. A non-transitory computer readable storage medium having stored therein instructions, which when executed by a robot, cause the robot to perform a feedforward control method for floating base dynamics, the feedforward control method comprising executing on a processor steps of:
    acquiring kinematic parameters of each joint of a robot at each moment based on inverse kinematics according to a pre-planned robot motion trajectory, and setting a center of a body of the robot as a floating base;
    determining a six-dimensional acceleration of a center of mass of each joint of the robot in a base coordinate system using a forward kinematics algorithm, based on the kinematic parameters of each joint of the robot, and converting the six-dimensional acceleration of the center of mass of each joint of the robot in the base coordinate system to a six-dimensional acceleration in a world coordinate system; and
    calculating a torque required by a motor of each joint of the robot using an inverse dynamic algorithm, based on the six-dimensional acceleration of the center of mass of each joint of the robot in the world coordinate system, and controlling the motors of corresponding joints of the robot using a feedforward control, based on the calculated torque.

10. The non-transitory computer readable storage medium of claim 9, wherein the kinematic parameters comprise angle, angular velocity and angular acceleration of the joint, a forward kinematic equation for calculating the six-dimensional acceleration of the center of mass of each joint of the robot in the base coordinate system is as follows:

$$a_i = J_i \cdot \ddot{\Theta} + \dot{J}_i \cdot \dot{\Theta}$$

where $a_i$ represents the six-dimensional acceleration of the center of mass of each joint of the robot in the base coordinate system, $J_i$ represents a Jacobian matrix of the center of mass of an i-th of the joints of the robot relative to the floating base, $\dot{J}_i$ represents a derivation matrix of the Jacobian matrix, $\dot{\Theta}$ represents angular velocity vector of each joint of the robot, $\ddot{\Theta}$ represents angular acceleration vector of each joint of the robot.

11. The non-transitory computer readable storage medium of claim 9, wherein the body of the robot comprises an inertial measurement unit, the step of converting the six-dimensional acceleration of the center of mass of each joint of the robot in the base coordinate system to a six-dimensional acceleration in a world coordinate system, comprises:
   calculating three-dimensional angular velocity and six-dimensional acceleration of the floating base in the world coordinate system, according to a posture of the floating base measured by the inertial measurement unit and a foot of the robot that is in contact with a support surface, using the forward kinematics algorithm; and
   performing a six-dimensional acceleration conversion for the center of mass of each joint of the robot in the base coordinate system, using a non-inertial-system-to-inertial-system acceleration conversion operator, based on the posture of the floating base and the three-dimensional angular velocity and the six-dimensional acceleration in the world coordinate system, so as to obtain the six-dimensional acceleration of the center of mass of each joint of the robot in the world coordinate system.

12. The non-transitory computer readable storage medium of claim 11, wherein a formula of the non-inertial-system-to-inertial-system acceleration conversion operator is as follows:

$$\partial_{word\_i} = \partial_{base} + R_{base} \cdot \partial_i + w_{base} \times R_{base} \cdot v_i + \beta_{base} \times R_{base} \cdot r_i + w_{base} \times w_{base} \times R_{base} \cdot r_i + W_{base} \times R_{base} \cdot v_i;\ \beta_{word\_i} = \beta_{base} + w_{base} \times R_{base} \cdot w_i + R_{base} \cdot \beta_i,$$

where $\partial_{word\_i}$ and $\beta_{word\_i}$ represent linear acceleration and angular acceleration of a center of mass of an i-th of the joints of the robot in the world coordinate system, $\partial_{bass}$ and $\beta_{base}$ represent linear acceleration and angular acceleration of the floating base in the world coordinate system, $w_{base}$ represents three-dimensional angular velocity of the base in the world coordinate system, $R_{base}$ represents a posture matrix of the base in the world coordinate system, $r_i$ represents a vector of the center of mass of the i-th of the joints of the robot in the base coordinate system, $v_i$ and $w_i$ represent linear velocity and angular velocity of the center of mass of the i-th of the joints of the robot in the base coordinate system, and $\partial_i$ and $\beta_i$ represent linear acceleration and angular acceleration of the center of mass of the i-th of the joints of the robot in the base coordinate system.

13. The non-transitory computer readable storage medium of claim 9, wherein the robot has n degrees of freedom and comprises n links when a single foot of the robot stays in contact with a support surface, the step of calculating a torque required by a motor of each joint of the robot using an inverse dynamic algorithm, based on the six-dimensional acceleration of the center of mass of each joint of the robot in the world coordinate system, comprises:

starting from an nth link, according to the six-dimensional acceleration of the center of mass of one corresponding joint of the robot in the world coordinate system and an external force and an external torque of the nth link, calculating an acting force and an acting torque between the nth link and an (n−1)th link connected to the nth link using Newton's Euler formula, and calculating, a torque required by the nth link based on the acting torque; and
calculating a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, decreasing n by one and repeating the step of calculating a torque required by the (n−1)th link, an acting force and an acting torque between the (n−1)th link and an (n−2)th link connected to the (n−1)th link using Newton's Euler formula, with the acting force and the acting torque between the nth link and an (n−1)th link as an external force and an external torque of the (n−1)th link, until a torque required by remaining of the links has been calculated.

14. The non-transitory computer readable storage medium of claim 13, wherein if the nth link is in contact with the support surface, the external force received by the nth link is a supporting force from the support surface.

15. The non-transitory computer readable storage medium of claim 14, wherein the acting force between the nth link and the (n−1)th link are calculated, according to a formula as follows:

$$\overrightarrow{F_{n,n-1}} + \overrightarrow{F_{external}} + m_n \vec{g} = m_n \overrightarrow{a_{world,n}},$$

represents the acting force between the nth link and the (n−1)th link, $m_n$ represents mass of the nth link, $\overrightarrow{a_{world,n}}$ represents three-dimensional linear acceleration of the nth link in the world coordinate system, $\vec{g}$ represents acceleration of gravity, and $\overrightarrow{F_{external}}$ represents the external force acting on the nth link.

16. The non-transitory computer readable storage medium of claim 15, wherein the step of calculating the acting torque between the nth link and the (n−1)th link comprises:
   calculating the acting torque applied to the nth link by the (n−1)th link according to a torque equation and a Euler formula, the torque equation is as follows:

$$\overrightarrow{N_n} = \overrightarrow{N_{external}} + \overrightarrow{N_{n-1,n}} + \vec{r}_1 \times \overrightarrow{F_{n-1,n}} + \vec{r}_2 \times \overrightarrow{F_{external}},$$

where $\overrightarrow{N_n}$ represents a resultant torque of the nth link at a center of mass thereof, $\overrightarrow{N_{external}}$ represents the external force acting on the nth link, $\overrightarrow{N_{n-1,n}}$ represents the acting torque applied to the nth link by the (n−1)th link, $\vec{r}_1$ represents a vector from a contact point of the (n−1)th link to the center of mass of the nth link, $\vec{r}_2$ represents a vector from a contact point with the support surface to the center of mass of the nth link;

the Euler formula is as follows:

$$\vec{N_n} = I_n \cdot \dot{\vec{w}}_n + \vec{w_n} \times I_n \vec{w_n},$$

where $I_n$ represents moment of inertia of the $\vec{w}_n$ represents a joint angular acceleration vector of the nth link, $\vec{w}_n$ and represents a joint angular velocity vector of the nth link.

17. A robot comprising:
one or more processors:
a storage; and
one or more computer programs stored in the storage and configured to be executed by the one or more processors to perform a feedforward control method for floating base dynamics, the feedforward control method comprising steps of:
acquiring kinematic parameters of each joint of a robot at each moment based on inverse kinematics according to a pre-planned robot motion trajectory, and setting a center of a body of the robot as a floating base;
determining a six-dimensional acceleration of a center of mass of each joint of the robot in a base coordinate system using a forward kinematics algorithm, based on the kinematic parameters of each joint of the robot, and converting the six-dimensional acceleration of the center of mass of each joint of the robot in the base coordinate system to a six-dimensional acceleration in a world coordinate system; and
calculating a torque required by a motor of each joint of the robot using an inverse dynamic algorithm, based on the six-dimensional acceleration of the center of mass of each joint of the robot in the world coordinate system, and controlling the motors of corresponding joints of the robot using a feedforward control, based on the calculated torque.

18. The robot of claim 17, wherein the kinematic parameters comprise angle, angular velocity and angular acceleration of the joint, a forward kinematic equation for calculating the six-dimensional acceleration of the center of mass of each joint of the robot in the base coordinate system is as follows:

$$a_i = J_i \cdot \ddot{\Theta} + \dot{J}_i \cdot \dot{\Theta}$$

where $\alpha_i$ represents the six-dimensional acceleration of the center of mass of each joint of the robot in the base coordinate system, $J_i$ represents a Jacobian matrix of the center of mass of an i-th of the joints of the robot relative to the floating base, $\dot{J}_i$ represents a derivation matrix of the Jacobian matrix, $\dot{\Theta}$ represents angular velocity vector of each joint of the robot, $\ddot{\Theta}$ represents angular acceleration vector of each joint of the robot.

19. The robot of claim 17, wherein the body of the robot comprises an inertial measurement unit, the step of converting the six-dimensional acceleration of the center of mass of each joint of the robot in the base coordinate system to a six-dimensional acceleration in a world coordinate system, comprises:
calculating three-dimensional angular velocity and six-dimensional acceleration of the floating base in the world coordinate system, according to a posture of the floating base measured by the inertial measurement unit and a foot of the robot that is in contact with a support surface, using the forward kinematics algorithm; and
performing a six-dimensional acceleration conversion for the center of mass of each joint of the robot in the base coordinate system, using a non-inertial-system-to-inertial-system acceleration conversion operator, based on the posture of the floating base and the three-dimensional angular velocity and the six-dimensional acceleration in the world coordinate system, so as to obtain the six-dimensional acceleration of the center of mass of each joint of the robot in the world coordinate system.

20. The robot of claim 19, wherein a formula of the non-inertial-system-to-inertial-system acceleration conversion operator is as follows:

$\partial_{word\_i} = \partial_{base} + R_{base} \cdot \partial_i + w_{base} \times R_{base} \cdot v_i + \beta_{base} \times R_{base} \cdot r_i + w_{base} \times w_{base} \times R_{base} \cdot r_i + W_{base} \times R_{base} \cdot v_i;$ $\beta_{word\_i} = \beta_{base} + w_{base} \times R_{base} \cdot w_i + R_{base} \cdot \beta_i,$ where $\partial_{word\_i}$ and $\beta_{word\_i}$ represent linear acceleration and angular acceleration of a center of mass of an i-th of the joints of the robot in the world coordinate system, $\partial_{bass}$ and $\beta_{base}$ represent linear acceleration and angular acceleration of the floating base in the world coordinate system, $w_{base}$ represents three-dimensional angular velocity of the base in the world coordinate system, $R_{base}$, represents a posture matrix of the base in the world coordinate system, $r_i$ represents a vector of the center of mass of the i-th of the joints of the robot in the base coordinate system, $v_i$ and $w_i$ represent linear velocity and angular velocity of the center of mass of the i-th of the joints of the robot in the base coordinate system, and $\partial_i$ and $\beta_i$ represent linear acceleration and angular acceleration of the center of mass of the i-th of the joints of the robot in the base coordinate system.

* * * * *